May 25, 1954 — C. C. LEE — 2,679,243

PORTABLE COOKING GRILL

Filed March 4, 1950

Inventor
Clarence C. Lee
By Ahley & Ahley
ATTORNEYS

Patented May 25, 1954

2,679,243

UNITED STATES PATENT OFFICE 2,679,243

PORTABLE COOKING GRILL

Clarence C. Lee, Dallas, Tex., assignor to
R. M. Liedstrand, Oakland, Calif.

Application March 4, 1950, Serial No. 147,719

10 Claims. (Cl. 126—25)

This invention relates to new and useful improvements in portable cooking grills.

One object of the invention is to provide an improved cooking grill which is collapsible so as to be readily portable and which is rigid when erected for use.

Another object of the invention is to provide an improved cooking grill having a grid mounted in such manner as to be quickly and readily adjusted relative to a firebox so as to vary the heat applied to the grid.

A further object of the invention is to provide an improved cooking grill having its cooking grid pivotally mounted so as to be capable of being swung toward and away from a firebox being slidably mounted so as to be movable into and out of alinement with the grid.

Still another object of the invention is to provide an improved grill, of the character described, having handle means for swinging the cooking grid relative to the grill and its firebox together with means operable by the handle means for releasably latching said grid in its adjusted positions.

A construction designed to carry out the invention will be hereinafter described together with other features of the invention.

Figure 1:
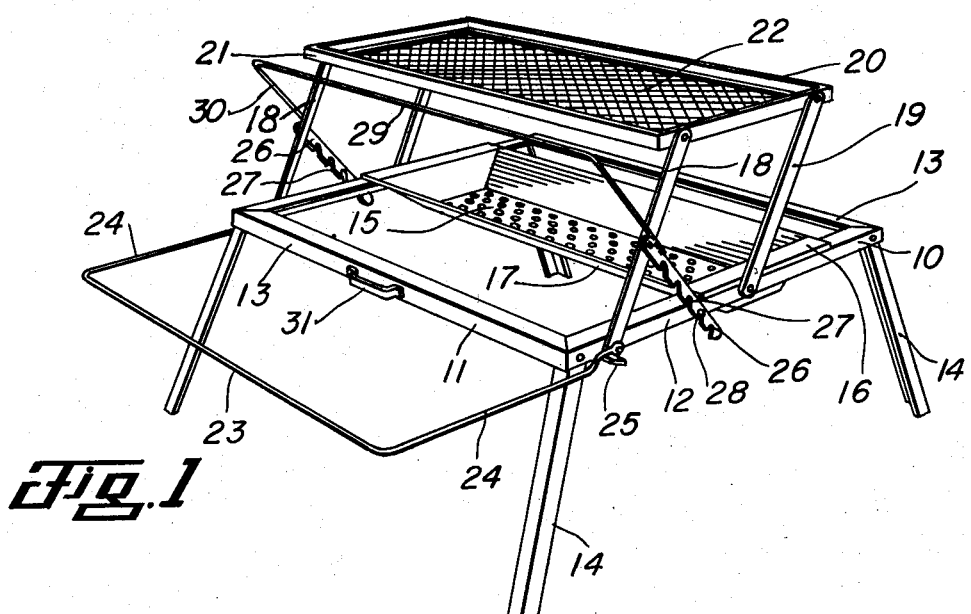
Figure 2:
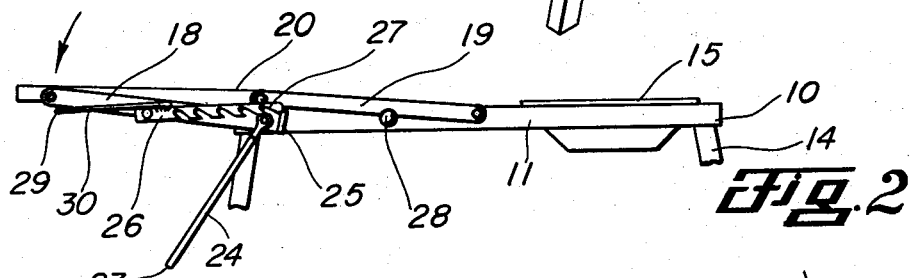
Figure 3:
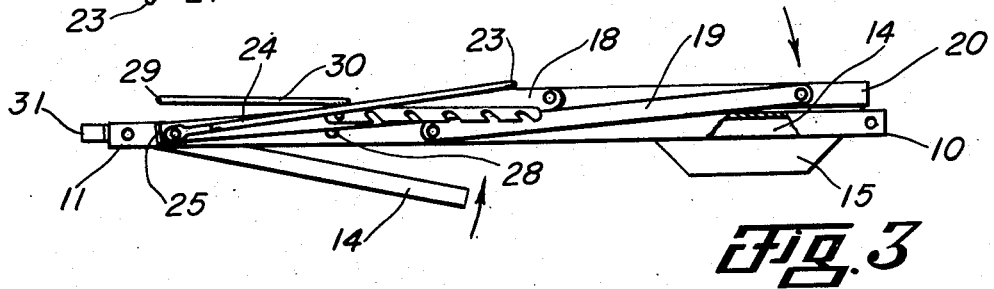
Figure 4:
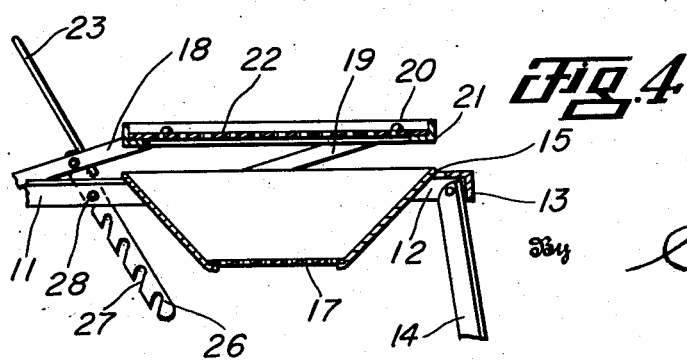

The invention will be more readily understood from a reading of the following specification and by reference to the accompanying drawing, wherein an example of the invention is shown, and wherein:

Fig. 1 is a perspective view of a portable cooking grill constructed in accordance with the invention and showing its grid elevated, Fig. 2 is a side elevational view of the grill, showing the grid swung to the extreme left in projecting relation to the grill frame, Fig. 3 is a side elevational view showing the grill in its folded position, and Fig. 4 is a sectional view showing the grid in a raised cooking position.

In the drawing, the numeral 10 designates a cooking grill of the portable, collapsible type which includes an open, quadrangular frame 11 having side members or rails 12 connected by end members or bars 13. The frame is shown as being substantially square and its members are preferably angular in cross section with upper, horizontal flanges and external, depending flanges. Inclined legs 14 preferably are riveted or otherwise pivotally connected to the side rails 12 adjacent their ends for supporting the frame in a horizontal plane. By disposing the legs 14 internally of the depending flanges of the side rails, said legs are foldable within the frame and bear against the end bars when swung outwardly to their supporting positions. A quadrangular firebox 15, having marginal flanges 16 at its ends and a foraminous bottom 17, is slidably mounted in the frame by having its flanges overlying the side rails. The firebox is shown as being of greater length than width and extending transversely of the frame so as to be of less size than the frame and movable longitudinally of said frame.

A pair of flat members or arms 18 and 19 are riveted or otherwise pivotally connected to each side rail in parallel relation for pivotally supporting a quadrangular grid 20 above the frame. The arms of each pair of arms are alined with the corresponding arms of the other pair and are disposed externally of the side rails. The lower ends of the arms 18 are attached adjacent the ends of the side rails, while the pivotal connections of the lower ends of the arms 19 are adjacent the centers of said rails. A marginal frame 21 of angle bars surrounds the grid 20 for supporting a screen 22 of large mesh, such as expanded metal, and the upper ends of the arms are riveted or otherwise pivoted to the end portions of the grid frame. The grid may be of the same approximate size as the firebox 15 and its transverse length is substantially equal to the width of the frame 11, whereby said grid may be swung into overlying engagement with said frame. Since the arms 18 and 19 are parallel and of equal length, it is manifest that the grid 20 is disposed in a plane parallel to the top of the frame irrespective of the position of said grid.

For swinging the grid relative to the frame and its firebox, a yoke or U-shaped handle 23 of a width slightly greater than the width of said frame is provided and has the ends of its legs 24 offset inwardly and pivotally attached to the lower ends of the arms 18. A flange or stop 25 is formed by bending the lower ends of the arms outwardly upon themselves for bearing engagement with the handle legs. Thus, counterclockwise pivoting of the handle 23 swings the arms in the same direction to raise the grid. Lowering of the grid is permitted by reverse or clockwise movement of the handle. It is noted that the handle may be swung in a clockwise direction relative to the arms so as to permit folding of said handle into overlying relation to the frame and grid (Fig. 3). In use, the handle projects angularly from one end of the frame in spaced relation to the grid and firebox.

For locking the grid in adjusted positions, a latch or ratchet bar 26 is pivotally connected to each arm 18 intermediate its ends so as to depend therefrom. Ratchet teeth or notches 27 are formed in the lower longitudinal edge portion of the bar for releasable engagement with a headed pin 28 projecting externally from the depending flange of the side rail intermediate the pivotal connections of the arms. To facilitate manipulation of the ratchet bars 26 and assist in the adjustment of the grid, an auxiliary yoke or U-shaped handle 29 is provided. The handle is of a width substantially equal to the width of the frame and has the extremities of its legs 30 rigidly secured to the ratchet bars adjacent the pivotal connections of the latter to the arms 18. The notches 27 are inclined upwardly toward the handle 29, whereby the ratchet bars may be readily swung downwardly into engagement with the pins 28 by counter-clockwise pivoting of said handle. Upon the engagement of the pins and notches, the arms are latched in fixed positions to rigidly support the grid. The ratchet bars are lifted and disengaged by swinging the handle 29 counter-clockwise so as to permit pivoting of the arms and adjustment of the grid. It is noted that the auxiliary handle may be pushed or pulled to assist movement of the arms in adjusting the grid. If desired, a carrying handle 31 may be provided on the left-hand end bar 13 of the frame.

Due to the slidable mounting of the firebox 15, the same may be moved into and out of registration with the grid 20. A normal cooking position of the grid is shown in Fig. 4, with the firebox slid to the right-hand end of the frame 11 and said grid lowered into overlying relation and latched in place by the uppermost notches of the ratchet bars being engaged with the pins 28. By swinging the handles 23 and 29, the elevation of the grid may be varied. If desired, the firebox may be slid toward the left so as to aline the same with the elevated grid. The pins 28 provide stops for engagement by the arms 19 so as to limit counter-clockwise pivoting of the arms (Fig. 2). In this position of the arms, the grid projects beyond the left-hand end of the frame and may be used as a work surface or shelf. As shown in Fig. 3, the grill may be compactly collapsed to facilitate handling and storage of the same. The legs 14 may be swung upwardly so as to be folded within and beneath the frame. With the grid lowered so as to overlie the right-hand end of the frame, the handle 29 and ratchet bars are swung counter-clockwise so that said handle overlies the left-hand end of said frame and said bars extend substantially parallel of the arms 18. The handle 23 then may be swung clockwise so as to extend parallel to the arms in substantially overlying relation to the grid.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A cooking grill including, an open horizontal frame, a firebox slidable from side to side in and on said frame, a grid, pairs of arms each pivotally connected to a portion of said frame and having pivotal connection with the grid for adjustably supporting said grid above said frame and firebox, and latch means for connecting the arms to said frame to lock said arms and grid in adjusted positions, the pivotal mounting of said grid permitting swinging of the same into and out of overlying relation to said frame and said slidable firebox.

2. A portable cooking grill including, a rectangular open frame, legs pivoted at their upper ends at each corner of the frame and foldable into said frame, an elongate firebox having supports at each end slidable on the frame, whereby the firebox may be slid laterally along the frame, arms having their lower ends pivoted to the frame, a grid above the frame pivoted on the upper ends of the arms, a handle having its ends pivoted to the grid arms, latch bars pivoted to said arms and engageable with the frame, and a handle member connecting the latch bars.

3. A cooking grill including, an open horizontal frame, legs pivotally connected to the frame so as to be foldable thereunder, an overlying grid of considerably less width than said frame, pairs of upright supporting arms pivotally connected at their ends to the grid and frame, a fire box of considerably less width than the frame and having its ends slidable on said frame, handle means connected to one of each pair of arms for swinging said arms to move the grid relative to the fire box and frame, and latch means carried by said arms and engaging said frame for latching the grill in adjusted positions.

4. A portable cooking grill including, an open horizontal frame, legs supporting the frame, a fire box slidable at its ends on said frame and movable from side to side within said frame, a grid above said frame, arms pivoted at their lower ends to said frame and pivoted at their upper ends to the grid, latch means pivoted to the arms and engaging said frame, and handle means attached to the latch means.

5. A portable cooking grill including, an open horizontal frame, a fire box of considerably less width than the frame and having its ends slidable on said frame so as to be freely movable from side to side of said frame, a grid of considerably less width than said frame, and means pivotally supporting the grid on said frame above said fire box whereby said grid is swingable from side to side of said frame independently of said fire box.

6. A portable cooking grill as set forth in claim 5 including, latch means having connection with the grid and engageable with the frame for holding said grid in adjusted positions.

7. A portable cooking grill as set forth in claim 5 wherein the pivotal supporting means includes, arms pivotally connecting the grid to the frame, latch elements pivoted to the arms and engageable with said frame, and a handle secured to the latch elements.

8. A cooking grill comprising a horizontal frame, said frame having parallel side edges; a firebox of less width than said frame mounted on said frame; a grid assembly comprising a horizontally disposed grid, and at least four links of equal length, at least two of said links being disposed on each end of said frame, the upper end of each link being pivotally attached to said grid, the lower end of each link being pivotally attached to one of said side edges of said frame, said grid assembly being swingable from side to side of said frame; pivoted latch means adjustably connecting a link and said frame for holding said grid assembly in a plurality of positions of different elevations relative to said firebox; a first handle connected to said latch means for disengaging said latch means; and a second handle connected to a link of said grid assembly adjacent the lower end thereof for swinging said grid assembly to different positions of elevation relative to said firebox when said latch means is disengaged.

9. A portable cooking grill including, a rectangular open frame, legs pivoted at their upper ends at each corner of the frame and foldable into said frame, an elongated firebox on said frame, arms having their lower ends pivoted to the frame, a grid above the frame pivoted on the upper ends of the arms, a handle having its ends connected to the grid arms adjacent the lower ends thereof for adjusting the elevation of said grid above firebox and parallel thereto, pivoted latch bars adjustably connecting at least two of said arms and said frame, and a handle member connecting the latch bars.

10. A cooking grill comprising a horizontal frame having an open space defined by the sides of said frame, a firebox mounted on said frame and having a portion located within said open space of said frame, a grid assembly comprising a horizontally disposed grid mounted at a level higher than said firebox, and at least four links of equal length, at least two of said links being disposed adjacent each end of said grid with the upper ends of each link pivotally attached to said grid and the lower end of each link pivotally attached to the adjacent portion of said frame, said grid assembly being swingable from side to side of said frame and with said grid constantly horizontal; pivoted latch means adjustably connecting a link and said frame for holding said grid assembly in a plurality of positions of different elevations relative to said firebox; a first handle connected to said latch means for disengaging said latch means; and a second handle connected to a link of said grid assembly adjacent the lower end thereof for swinging said grid assembly to different positions of elevation relative to said firebox when said latch means is disengaged.

References Cited in the file of this patent
UNITED STATES PATENTS

| Number | Name | Date |
|---|---|---|
| 2,114,697 | Babin | Apr. 19, 1938 |
| 2,158,805 | Smith | May 16, 1939 |
| 2,265,421 | Donnelly | Dec. 9, 1941 |
| 2,307,914 | Bitney | Jan. 12, 1943 |
| 2,325,828 | Betts | Aug. 3, 1943 |
| 2,467,480 | Hudson | Apr. 19, 1949 |
| 2,473,569 | Cast | June 21, 1949 |